No. 822,561. PATENTED JUNE 5, 1906.
P. D. THROPP.
APPARATUS FOR MANUFACTURING WHEEL TIRES.
APPLICATION FILED NOV. 1, 1905.
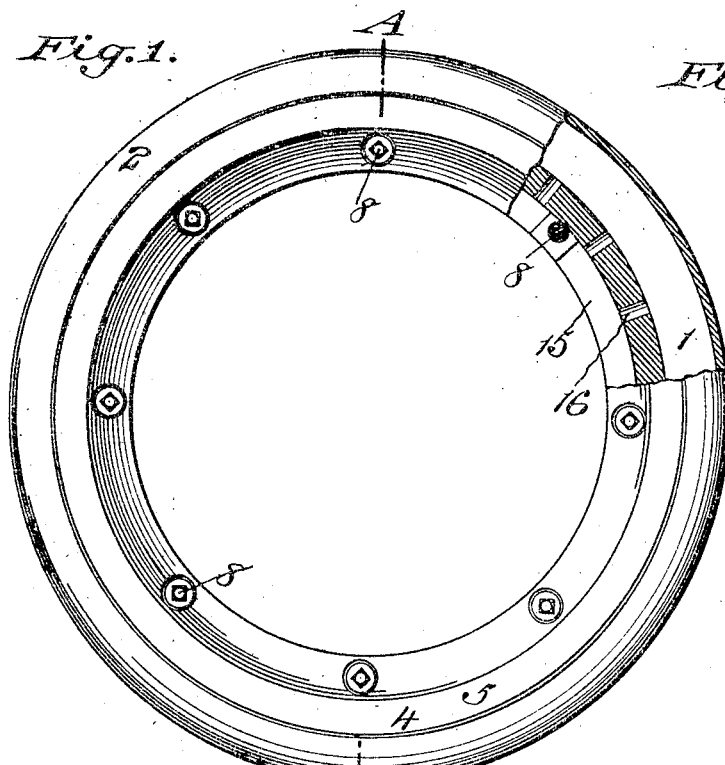
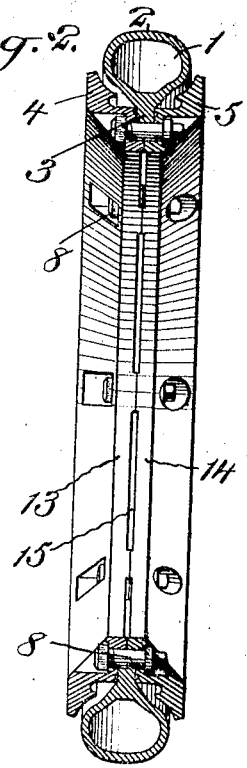
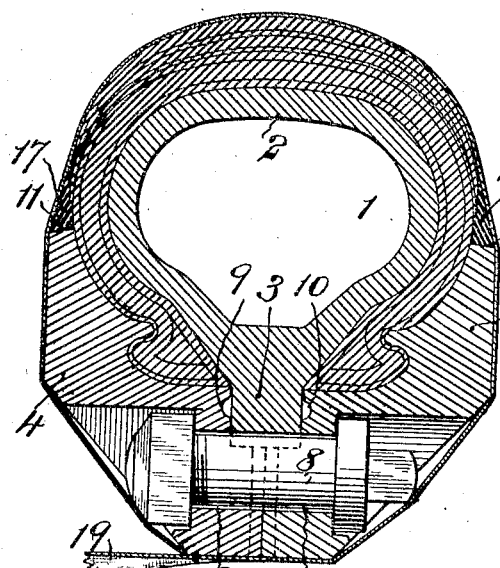
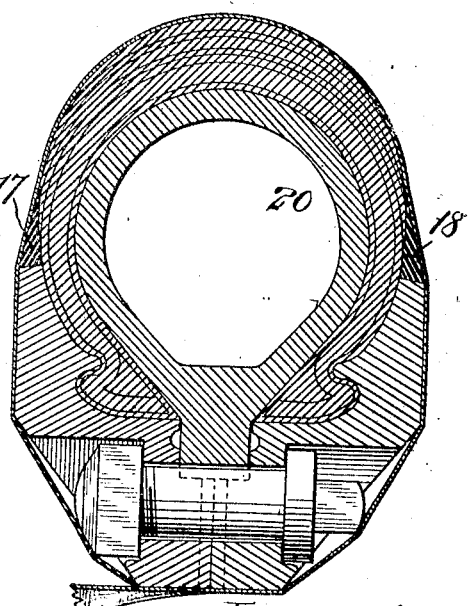
Witnesses:
F. George Barry
Henry Thieme
Inventor
Peter D. Thropp
By Brown & Seward
Attorneys

UNITED STATES PATENT OFFICE.

PETER D. THROPP, OF TRENTON, NEW JERSEY.

APPARATUS FOR MANUFACTURING WHEEL-TIRES.

No. 822,561.   Specification of Letters Patent.   Patented June 5, 1906.

Application filed November 1, 1905. Serial No. 285,366.

*To all whom it may concern:*

Be it known that I, PETER D. THROPP, a citizen of the United States, and a resident of Trenton, in the county of Mercer and State of New Jersey, have invented a new and useful Improvement in Apparatus for Manufacturing Wheel-Tires, of which the following is a specification.

My invention relates to apparatus for manufacturing wheel-tires, and more particularly to apparatus for holding a clencher-tire in position during the vulcanizing process.

A practical embodiment of my invention is represented in the accompanying drawings, in which—

Figure 1 is a view of the apparatus in side elevation, partly in section. Fig. 2 is a transverse section in the plane of the line A A of Fig. 1. Fig. 3 is an enlarged transverse section showing the tire in position, and Fig. 4 is a similar view showing a tire of different shape in cross-section.

Referring to Figs. 1, 2, and 3, 1 represents an annular hollow core or mandrel having the shape in cross-section which it is desired to give the completed tire. In the present instance the outer part of the exterior of the core is flattened, as shown at 2, and the inner portion is gradually tapered to form the clencher edges of the tire in substantially the position which they will normally occupy when in use. The extreme inner portion of the core is projected in the form of a rib or flange 3 to serve to limit the inward movement of the pressure-rings and hold them the proper distance apart to form the clencher edges of the tire properly.

The pressure-rings are denoted by 4 and 5. They are intended to occupy positions on opposite sides of the inner portion of the core and are provided at intervals with bolt-holes 6 and 7, which register with each other and receive bolts 8 for the purpose of drawing the two rings toward each other. The faces of the pressure-rings toward the core 1 are shaped to impart to the edges of the tire the usual clencher-hooks, and when drawn into position by the bolts 8 their bearing-shoulders 9 and 10 will contact with the opposite sides of the rib 3. The outer edges of the pressure-rings are made quite thick, as shown at 11 and 12, in order to make them firm, and their inner flanges 13 14 are separated at intervals, producing narrow slots 15, which communicate with holes 16 in the rib of the core, thereby opening communication between the interior of the core and outer or surrounding medium.

In operation, the several elements of the tire having been placed in position on the core and the pressure-rings forced into position by the bolts 8, filling-rings 17 18 of wedge shape in cross-section are placed against the sides of the tire above the thick edges 11 and 12 of the pressure-rings, and the whole is wound with a wrapping of tape 19, the filling-pieces 17 18 serving to impart the pressure of the winding-tape to the sides of the tire to hold the latter in position during the vulcanizing process.

After vulcanizing the tape may be removed and the pressure-rings, as well as the filling-rings, separated from the tire, and the latter then slipped from the core or mandrel.

The apparatus is simple, effective, and may be manipulated with great rapidity.

The core 20, Fig. 4, is suited for a tire of circular form as distinguished from the flattened form. In other respects the apparatus shown in Fig. 4 is quite similar to that shown in the other figures.

What I claim as my invention is—

1. Tire-forming apparatus comprising an annular core or mandrel, annular pressure-rings arranged to engage the clencher edges of the tire leaving the outer body portion of the tire exposed and means for forcing the pressure-rings into a predetermined position with respect to the core or mandrel.

2. Tire-forming apparatus comprising an annular core or mandrel provided with an inwardly-extending rib, pressure-rings arranged to engage the clencher edges of the tire on opposite sides of the said rib leaving the outer body portion of the tire exposed and means for forcing the pressure-rings against the opposite sides of the rib.

3. Tire-forming apparatus comprising an annular core or mandrel, pressure-rings arranged to engage the clencher edges of the tire leaving the body of the tire exposed, the said pressure-rings being provided with blunt outer edges, filling-rings wedge shape in cross-section for engaging the tire in proximity to the said blunt edges and means for forcing the pressure-rings toward each other.

4. Tire-forming apparatus comprising an annular hollow core provided with an inwardly-extending rib having perforations therethrough, annular pressure-rings arranged to engage the clencher edges of the tire leaving the outer body portion of the tire exposed, the said rings having their adjacent edges spaced apart at intervals, and means for forcing the pressure-rings toward each other In testimony that I claim the foregoing as my invention I have signed my name, in presence of two witnesses, this 1st day of September, 1905.

PETER D. THROPP.

Witnesses:
CLIFFORD W. LEE,
H. P. MESSLER.